(No Model.) 4 Sheets—Sheet 1.
C. C. ADELSPERGER.
SHIFTING SEAT FOR VEHICLES.
No. 466,211. Patented Dec. 29, 1891.
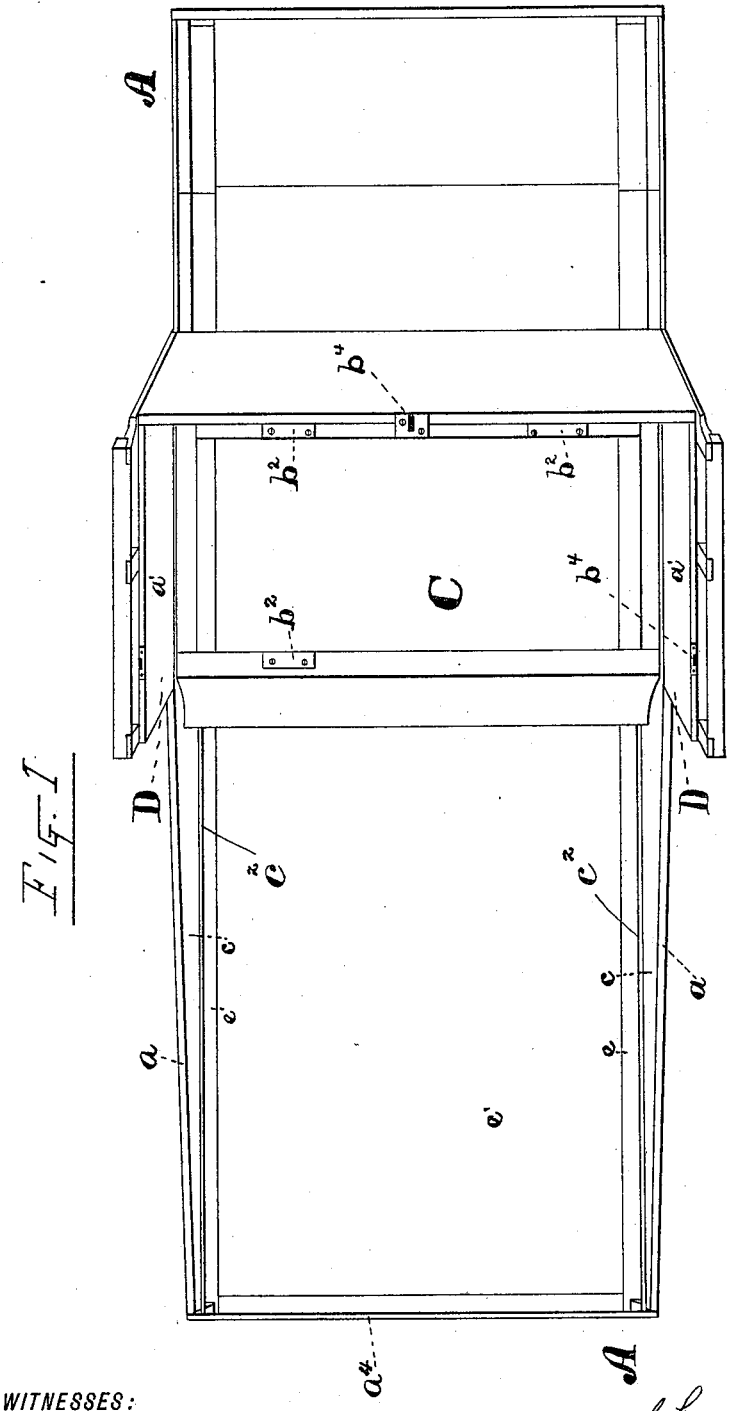
WITNESSES:
F. A. Rice
Chas. J. Welch
INVENTOR
Charles C. Adelsperger
BY
Shipherd & Shipherd
ATTORNEYS (No Model.)  4 Sheets—Sheet 2.
C. C. ADELSPERGER.
SHIFTING SEAT FOR VEHICLES.
No. 466,211. Patented Dec. 29, 1891.
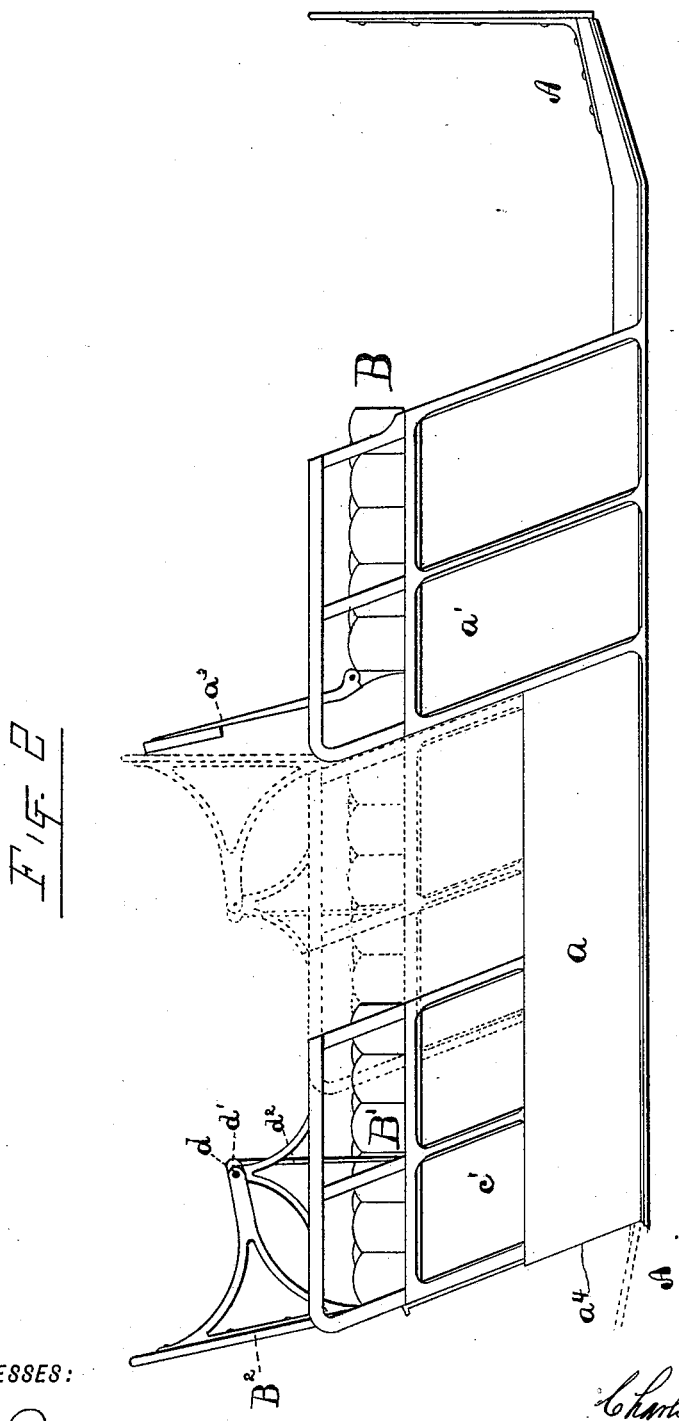

(No Model.) 4 Sheets—Sheet 3.
C. C. ADELSPERGER.
SHIFTING SEAT FOR VEHICLES.
No. 466,211. Patented Dec. 29, 1891.
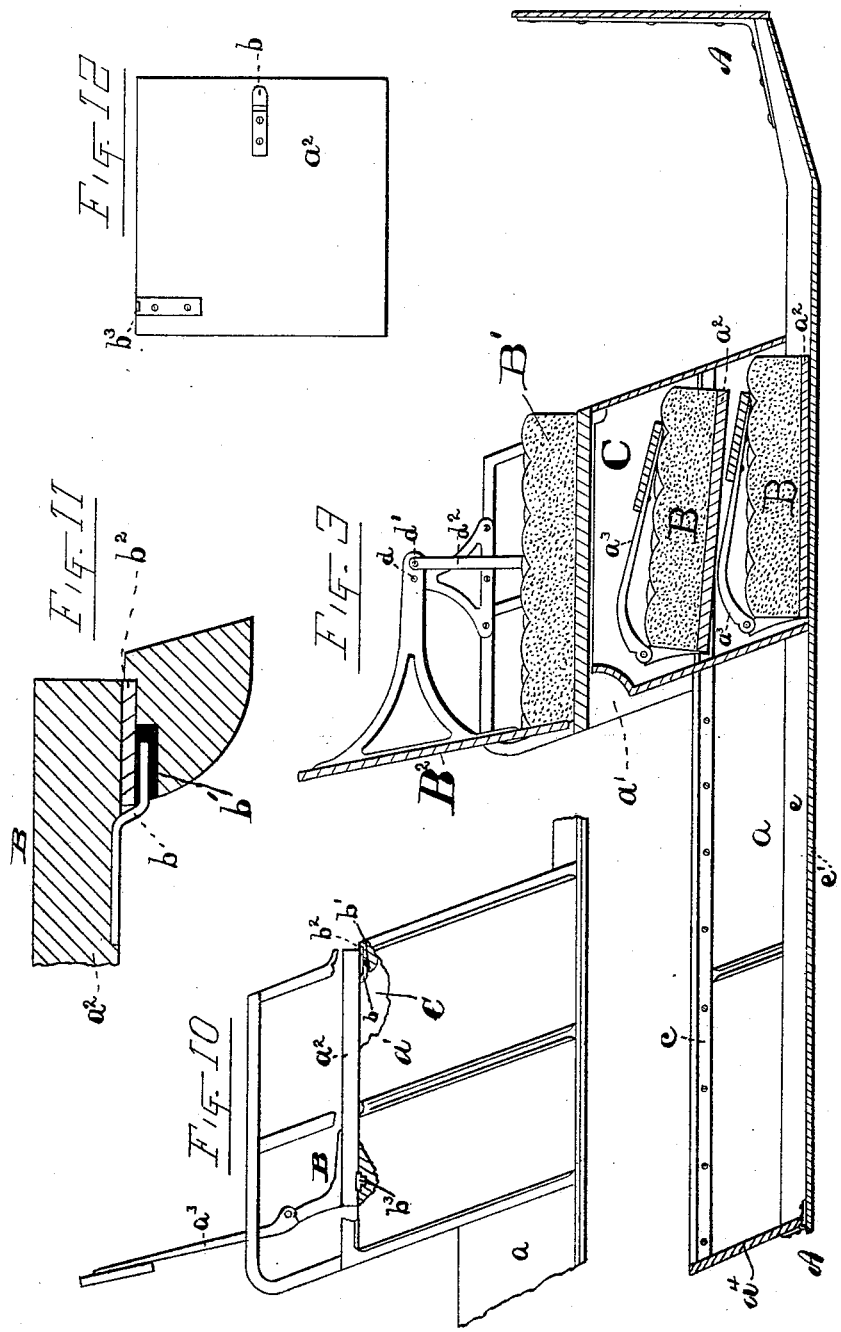
WITNESSES:
F. A. Rice
Chas. I. Welch
INVENTOR
Charles C. Adelsperger
BY
Staley and Shepherd
ATTORNEYS

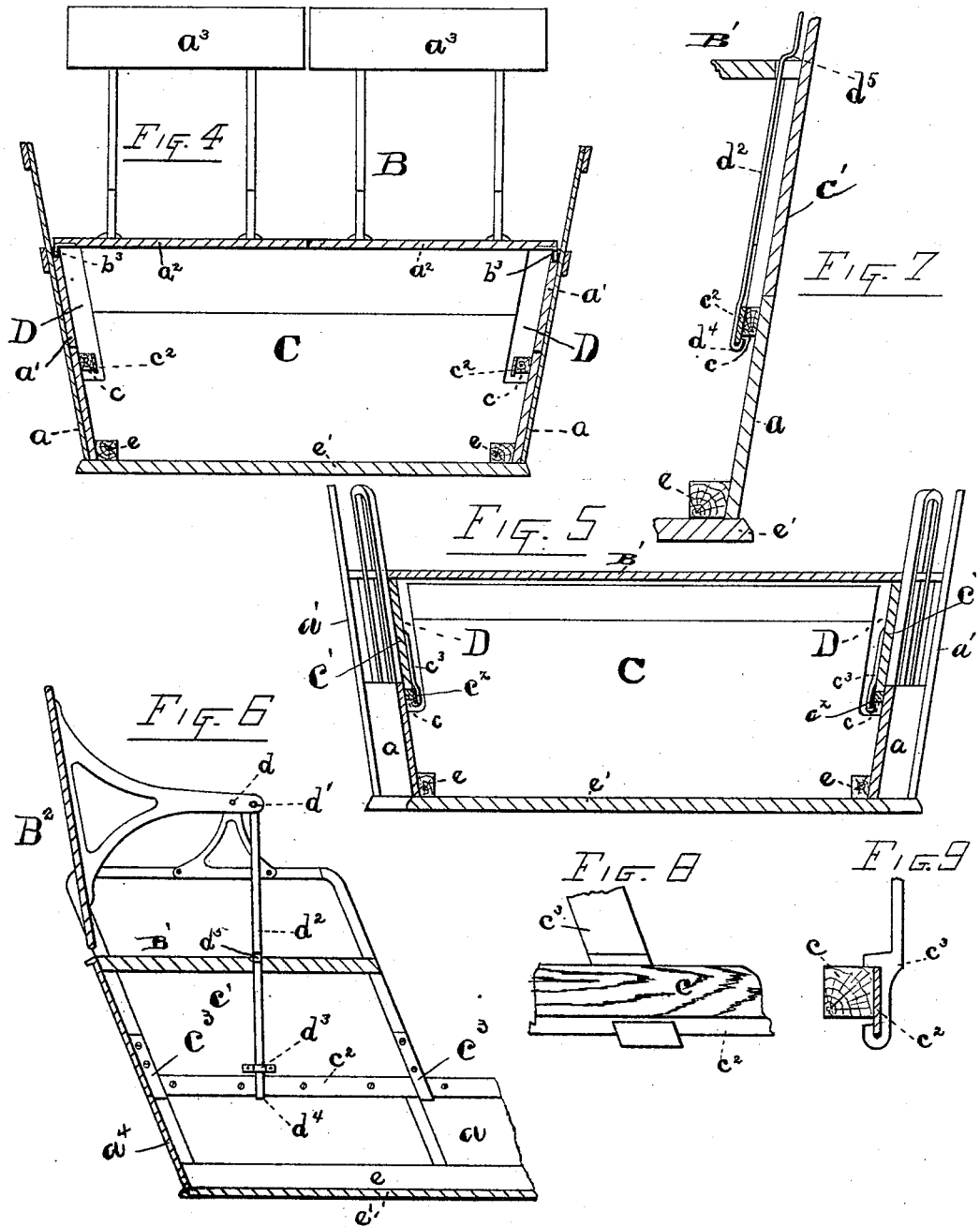

UNITED STATES PATENT OFFICE.

CHARLES C. ADELSPERGER, OF SPRINGFIELD, OHIO, ASSIGNOR TO THE STAR SLIDE SEAT COMPANY, OF SAME PLACE.

SHIFTING SEAT FOR VEHICLES.

SPECIFICATION forming part of Letters Patent No. 466,211, dated December 29, 1891.

Application filed June 13, 1891. Serial No. 396,197. (No model.)

*To all whom it may concern:*

Be it known that I, CHARLES C. ADELSPERGER, a citizen of the United States, residing at Springfield, in the county of Clark and State of Ohio, have invented certain new and useful Improvements in Shifting-Seated Vehicles, of which the following is a specification.

My invention relates to improvements in shifting-seated vehicles; and the object is to provide a vehicle which may be converted into a single or double seated vehicle, as desired, and when used as a double-seated vehicle with the seats arranged so that the occupants thereof shall face in opposite directions or in the same direction, as preferred.

A further object of my invention is to provide such constructions to accomplish this result as will permit the employment of an ordinary body or bed so arranged that when adjusted as a two-seated vehicle the construction shall not differ materially in appearance from an ordinary stationary-seated carriage or surrey.

I attain these objects by the constructions shown in the accompanying drawings, which form a part of this specification, in which—

Figure 1 is a plan view of a device embodying my invention arranged as a single-seated vehicle. Fig. 2 is a side elevation of the same, arranged as a two-seated vehicle with the occupants facing in the same direction, the position of the rear seat being shown in dotted lines, in which the occupants face in opposite directions. Fig. 3 is a longitudinal sectional view of the same with the parts arranged as shown in Fig. 1. Fig. 4 is a transverse elevation of the same immediately behind the forward seat with the seat proper shown in section. Fig. 5 is a similar view through the rear seat when moved to its backward position. Figs. 6 to 12, inclusive, are details of the parts hereinafter referred to.

In the said drawings, A A represent the body or bed of an ordinary vehicle, which is preferably provided with upwardly-projecting sides or panels $a$ $a$ to form a bed or body, inclosed in the rear in a well-known manner. The panels $a$ are preferably formed of a uniform height in the rear of the front seat at about half the elevation of the seat proper, said panels being extended at each side at the front, as shown at $a'$, to form supports for the front seat B.

Immediately below the front seat B and inside of the projecting panels $a'$ is an inclosed box or receptacle C, which I will term the "curtain-box," the sides and ends of which are extended upwardly, so as to stand flush or substantially flush with the tops of the extended panels $a'$ $a'$. This curtain-box C extends entirely across the body at the bottom, but is formed at the top independent of the sides or panels $a'$, the end pieces of said box being located inside of said panels and removed therefrom a suitable distance to form an open pocket D on each side thereof.

The seat proper B is preferably formed in two parts, each having a solid bottom $a^2$, formed of wood or other suitable material and upholstered in any desired manner. Hinged lazy-backs $a^3$ are secured to the respective bottoms $a^2$ and adapted to fold in the usual manner, when desired. These seat-bottoms $a^2$ rest, respectively, on top of the sides and ends of the curtain-box C, and also on top of the extended panels $a'$, so as to completely inclose the pockets D at the top. Small hook-shaped projections $b$ on the respective seat-bottoms $a^2$ are adapted to engage in suitable recesses $b'$ under a plate $b^2$, arranged in the top edge of the front or rear of the curtain-box C, suitable downwardly-projecting studs $b^3$ being adapted to fit in corresponding openings or sockets $b^4$ in the respective supporting faces or ledges to hold the parts against lateral movement thereon. One of the sections of the front seat B is preferably adapted to be reversed, so that the occupants of said seat may face to the rear, when desired, this being accomplished by providing retaining-plates $b^2$ with corresponding sockets for the hook-shaped projections $b$ on said seat at both the front and rear of the curtain-box, as shown in Fig. 1.

Extending longitudinally along the panel $a$, preferably near the top edge thereof, is a supporting way or guide $c$, on which is adapted to slide the rear seat B′, which consists, preferably, of a solid seat having a rigid bottom connected to side panels or supports $c'$, which rest and slide upon the stationary guides or ways $c$. The guides or ways $c$ are each preferably provided with a metallic plate $c^2$, adapted to be engaged by a hook-shaped projection $c^3$, connected to the bottom of the supporting-panels $c'$ of the rear seat, as shown in detail in Figs. 8 and 9, so that the seat is held securely against any displacement, but is capable of a backward or forward movement on said guides or ways. These guides or ways $c$ are extended forwardly along the side panels $a$, through the open pockets or recesses D, between the curtain-box and the extended panels $a'$ of the front seat, and the bottom of the rear seat proper is arranged at the same vertical height as the bottom of the front seat when said seats are both in a position to be occupied. It will be seen now that by removing the front seat the back seat may be pushed bodily along the supporting-ways $c$ until it occupies exactly the same position formerly occupied by the front seat, and thus takes the place of said front seat, the supporting-panels $c'$ of the rear seat being adapted to slide into the pockets D and coincide with the similarly-formed projecting panels $a'$ of the front seat. When thus shifted, the device is in position as a single-seated vehicle, and the sections of the front seat B are folded and placed in the curtain-box C, as shown in Fig. 3.

The rear seat B' is provided with a hinged lazy-back $B^2$, pivoted at $d$ to the side arms or supporting-panels of said seat, so that said lazy-back may be turned to a position either in front or back of said seat, as indicated in full and dotted lines in Fig. 2. By shifting the rear seat therefore to the position indicated by dotted lines, with the front of said seat in proximity to the rear of the front seat and by turning the lazy-back, as indicated, a two-seated vehicle may be formed in which the seats face in opposite directions. By changing one section of the front seat only so as to face rearwardly, as before described, with the rear seat shifted to its rearmost position, a vehicle is formed in which three of the occupants face each other, with the driver's seat in front facing in the usual forward direction.

The rear end of the vehicle-body is preferably closed by a hinged end or gate $a^4$, which may be lowered, when desired, to the position indicated by dotted lines in Fig. 2, and thus form an extension to the body or bed when the seats are shifted back to back, as indicated by dotted lines in Fig. 1.

To provide for locking the rear seat in any desired position of adjustment, I extend the respective arms of the lazy-back $B^2$ beyond the pivotal point $d$, as shown at $d'$, and connected thereto a downwardly-extending bar $d^2$, passing through the seat proper and through a suitable guide $d^3$, and provided at the bottom with an engaging-hook $d^4$, which engages with the bar $c^2$ of the way $c$. By this construction it will be seen that as the lazy-back is turned to its normal position in either direction the clamping-bar $d^2$ is caused to engage the supporting way or guide, and thus clamp the said seat firmly thereto. I preferably form a yielding connection between the lazy-back and the clamp $d^4$, connected thereto. This I preferably accomplish by forming the bar $d^2$ of steel or other elastic material and provide the same with an ogee or dog-leg bend $d^5$, adapted, as the parts are drawn to the limit of their movement, to yield, and thus form an elastic connection which will firmly clamp the parts without danger of breakage.

It will be understood that the rear seat and its supports being adapted to slide within the recesses or pockets D between the curtain-box and front supporting-panels $a'$ must necessarily be shorter than the front seat, and therefore slightly less in length than the distance between the respective side panels $a$ where they join the extended panels $a'$ of the front seat. It is desirable, when in its rear position, that the rear seat and its supporting-panels should stand flush with the side panels $a$ of the bed or body. For this reason we preferably form the top of the said bed or body slightly narrower in the rear than in the front, the bottom, owing to the vertical angle of the side panels $a$ $a$, remaining of a uniform width. The top of the panels will thus be drawn inwardly toward the rear, as indicated in Figs. 1 and 5, forming a swelled bed or body in front, so that when the rear seat is shifted to its rearmost position the outer surface of the side supports or panels $c'$ of said seat shall stand flush or substantially flush with the outside of the panels or sides $a$ $a$ of the body A A.

It will be seen that as thus described a vehicle is produced by which, when the seats are arranged in the position shown in Fig. 2, an ordinary appearing two-seated vehicle or carriage is secured, the bed or body of which has a solid and continuous appearance. At the same time the seats may be shifted in the various ways heretofore described to produce almost any arrangement or combination for the occupants found in any vehicle with a similar number of seats. By having the front seat-supports formed independent of the side panels, as described, the rear seat is adapted to slide over said supports and take the place of the front seat-sections and become, in fact, the front seat. At the same time a convenient place for storing the front seat-sections, the carriage-curtains, or any other loose parts is provided in the curtain-box, which forms the seat-supports.

It is evident that a vehicle as thus described may be supplied with any desired form of top or may be left open, as desired.

It will be understood that while the top of the panels forming the body are drawn inwardly at the rear to form the swelled body, as described, the supporting-ways of the sliding seat are continued straight, the sill or ridge which forms the ways being beveled or formed narrower at the rear to secure the proper angle of the panel and sill and allow the supporting edge of the sill or way to pass straight from the front seat rearwardly.

It is obvious that the location of the supporting-ways may be varied as desired; but I preferably place it near the top of the panel, as before described. It is obvious that the parts may be variously modified without departing from the spirit of my invention. I do not therefore limit myself to the exact constructions shown and described, but claim—

1. In a vehicle, the combination, with a removable front seat and extended side supports for the same, of a supporting box or chamber under said seat and within said side supports, with pockets or recesses between the ends of said supporting-box and said side supports and supporting-ways extending into said pockets or recesses, and a shifting seat on said ways adapted to be moved into said pockets or recesses and take the place of the front seat, substantially as specified.

2. The combination, in a vehicle having stationary front-seat supports and upwardly-extending side panels at the side of said seat-supports, supporting-ways on said side panels, and a shifting seat on said supporting-ways adapted to slide between the panels and the front-seat supports and displace said front seat, substantially as specified.

3. The combination, with the stationary front-seat supports and a removable seat thereon, of a sliding seat supported on suitable ways and adapted to be moved into the position occupied by said removable seat, and a yielding clamp on said sliding seat to engage said ways, and a hinged lazy-back adapted to be turned to the front or rear of said shifting seat and operate said clamp in either position, substantially as specified.

4. The combination, with a shifting seat and the supporting guides or ways, of a centrally-hinged lazy-back on said seat, and a clamping-bar pivoted to said lazy-back at a point removed from the pivoted center thereof, said clamping-bar being adapted to engage the supporting-ways on which said seat is supported and provided with a yielding offset or bend, substantially as and for the purpose specified.

5. The combination, in a vehicle-body having side panels extended in front to form seat-supports, as specified, of a supporting-box for said front seat the top of which stands flush with the top of said side panels, the ends of said box being arranged within said supporting-panels a suitable distance to form a pocket or recess between the same, a removable front seat adapted to rest on said box and extend over said pocket or recesses, and a rear shifting seat adapted to be moved into position in said pockets or recesses and take the place of said front seats, substantially as specified.

6. In a shifting-seated vehicle, a removable front seat and a rear shifting seat, said shifting seat being slightly shorter than the front seat, and a swelled body the panels of which are contracted in the rear to conform to the length of the shifting seat when moved to its backward position, substantially as specified.

7. The combination, in a vehicle, of a removable front seat and stationary supports therefor, open pockets or recesses arranged in said seat-supports, and an extended body having a sill or rail adapted to form ways or supports for a shifting seat, said ways being extended into said recesses or pockets, substantially as specified.

8. The combination, in a vehicle-body having extended side panels and a stationary curtain-box the top of which is substantially flush with the top of said panels, recessed openings between the curtain-box and said panels, a removable front seat formed in sections, one or more of which sections may be reversed so as to face in opposite directions from the other section or sections, and a rear shifting seat adapted to be moved over said curtain-box and displace the front seat when the said sections are removed, substantially as specified.

9. In a vehicle-body having extended side panels, a stationary curtain-box inside of and removed from said panels, a sectional seat adapted to rest on said curtain-box and panels, projecting lugs on said seat-sections adapted to engage in recesses in said curtain-box to retain said seat-sections in position, one or more of said seat-sections being adapted to be reversed, as described, and a shifting seat supported on suitable ways extending longitudinally between the side panels and curtain-box, whereby said shifting-seat may be moved over said curtain-box and take the place of said sectional seat, substantially as specified.

In testimony whereof I have hereunto set my hand this 11th day of June, A. D. 1891.

CHARLES C. ADELSPERGER.

Witnesses:
CHAS. I. WELCH,
R. D. BALDWIN.